3,020,315
ARYL PHENYL α,α,α-TRIFLUORO-m-TOLYL PHOSPHINES AND OXIDES THEREOF
John Robert Campbell, St. Louis, and Roger E. Hatton, Kirkwood, Mo., assignors to Monsanto Chemical Company, St. Louis, Mo., a corporation of Delaware
No Drawing. Filed Aug. 26, 1960, Ser. No. 52,012
5 Claims. (Cl. 260—606.5)

This invention relates to new aryl phenyl α,α,α-trifluoro-m-tolyl phosphines and oxides thereof which can be represented by the structure,

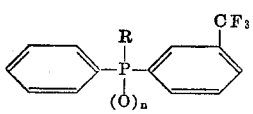

where R is selected from m-tolyl and α,α,α-trifluoro-m-tolyl radicals and n is 0 or 1.

Preparation of the compounds of this invention is illustrated in the following non-limiting examples where parts are parts by weight.

*Example 1*

A Grignard reagent is prepared by charging into a suitable reaction vessel, having means for the addition of liquids and solids, external heating means and internal agitating means and fitted with a reflux head having reflux cooling means and temperature measuring means, 2.7 parts of magnesium in dry ether. While maintaining a nitrogen atmosphere within the reaction vessel a few parts of 24.7 parts of m-bromobenzotrifluoride in ether are added, a crystal of iodine introduced, and the mixture heated at reflux for about 10–15 minutes until reaction commences. Heating is then discontinued and the remainder of the fluoride added at a rate sufficient to maintain reflux. The mixture is then heated for about two hours to insure complete formation of the Grignard reagent.

The Grignard reagent is added rapidly to a cool solution of 17.9 parts of benzene phosphorus dichloride in 50 ml. of dry ether and the resulting mixture heated for about 1 hour at reflux conditions. A Grignard reagent prepared as above from 2.7 parts of magnesium and 18.8 parts of m-bromotoluene is then added rapidly to the cooled reaction mixture. After completing the addition of the second Grignard reagent, the reaction mixture is agitated for about 2 hours at room temperature and then held at reflux conditions for about 5 hours. Thereafter the reaction mixture is cooled to room temperature and poured into a saturated aqueous solution of ammonium chloride. The organic material is then extracted with ether and the extract washed with water and dried. After removal of the ether by evaporation, the residue is distilled under vacuum to give phenyl m-tolyl α,α,α-trifluoro-m-tolyl phosphine, a viscous oil having a boiling range of 150–180° C. at 0.5 mm. of mercury absolute.

*Example 2*

Phenyl m-tolyl α,α,α-trifluoro-m-tolyl phosphine can be converted to its oxide by heating (ca. 60–70° C.) an acetic acid solution of said phosphine with hydrogen peroxide, cooling the reaction mixture to about room temperature, pouring said mixture into water and collecting the solid phosphine oxide by filtration. The collected solids are then washed with water and recrystallized from ethyl alcohol to yield phenyl m-tolyl α,α,α-trifluoro-m-tolyl phosphine oxide, M.P. 93–94° C.

*Example 3*

In a suitable reaction vessel (as described in Example 1) a Grignard reagent is prepared in ether from 4.9 parts of magnesium and 45 parts of m-bromobenzo-trifluoride. To the ether solution of the Grignard is added an ether solution of 17.9 parts of benzene phosphorus dichloride and the resulting mixture heated at reflux conditions for about 4 hours. The reaction mixture is then cooled in an ice bath and the magnesium complex is then hydrolyzed with dilute hydrochloric acid. The ether layer is then separated, washed with water and dried. After removal of the ether by evaporation and distillation under vacuum of the residue, there is obtained bis(α,α,α-trifluoro-m-tolyl)phenyl phosphine, boiling range 123°–126° C. at 0.2 mm. of mercury absolute.

By the procedure illustrated in Example 2, bis(α,α,α-trifluoro-m-tolyl)phenyl phosphine can be converted to bis(α,α,α-trifluoro-m-tolyl)phenyl phosphine oxide, a white crystalline solid.

The compounds of this invention are primarily useful as functional fluids, even at high temperatures of the order of 700° F. which are used as force transmission fluids for the transmission of pressure, power or torque in fluid pressure or torque actuated mechanisms, such as for example, the "hydraulic fluids" for transmitting fluid pressure to the ram cylinders of hydraulic presses or in devices for the absorption and dissipation of energy such as shock absorbers or recoil mechanisms, or for transmission of torque through torque converter types of fluid couplings. The functional fluids of this invention may also be used as damping fluids which are the liquid compositions used for damping mechanical vibrations or resisting other rapid mechanical movements. The functional fluids of this invention are also suitable for use as synthetic lubricants between relatively moving mechanical parts, as bases for synthetic greases, especially in the case of our compounds which are solids at ordinary temperatures, and as the liquid material in the filters of air conditioning systems. When used as functional fluids our compounds can be used per se or they can be used in combination with other base stocks or with various addition agents, such as oxidation inhibitors, rust inhibitors, anti-foaming agents, detergents, viscosity index improvers compatible therewith, etc., whenever specific uses require such addition agents.

The compounds of this invention are also useful as preignition agents in leaded gasoline fuels, especially reciprocating internal combustion engine gasoline fuels, i.e. petroleum fractions boiling in the gasoline hydrocarbon range of from about 70° F. to about 450° F. For such an application our compounds are generally added to the gasoline fuel in an amount sufficient to provide from about 0.01 to about 1.0 theory of phosphorus.

The embodiments of the invention in which an exclusive property or privilege is claimed is defined as follows:

1. Phosphines and phosphine oxides represented by the structure,

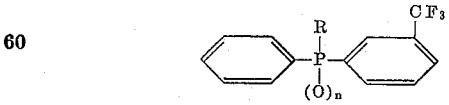

where R is selected from the group consisting of m-tolyl and α,α,α-trifluoro-m-tolyl radicals and n is an integer from 0 to 1.

2. Bis(α,α,α-trifluoro-m-tolyl)phenyl phosphine.
3. Bis(α,α,α-trifluoro-m-tolyl)phenyl phosphine oxide.
4. Phenyl m-tolyl α,α,α-trifluoro-m-tolyl phosphine.
5. Phenyl m-tolyl α,α,α-trifluoro-m-tolyl phosphine oxide.

No references cited.